Figure 1:
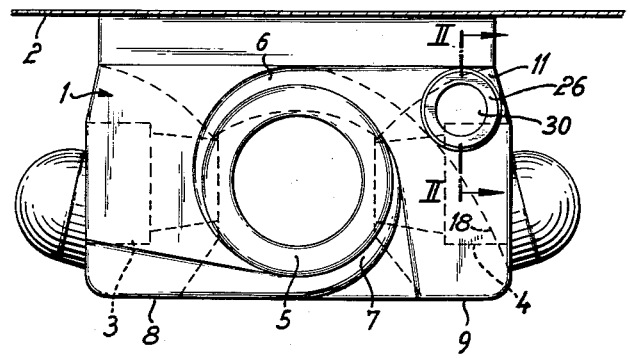

Dec. 27, 1960   R. BINDER   2,966,147
AIR-COOLED INTERNAL COMBUSTION ENGINE ARRANGEMENT
Filed Aug. 17, 1959

INVENTOR
Robert BINDER

BY

Dicke, Craig and Freudenberg
ATTORNEY

United States Patent Office 2,966,147
Patented Dec. 27, 1960

2,966,147

AIR-COOLED INTERNAL COMBUSTION ENGINE ARRANGEMENT

Robert Binder, Stuttgart-Zuffenhausen, Germany, assignor to Dr.-Ing. h.c.F. Porsche K.G., Stuttgart-Zuffenhausen, Germany Filed Aug. 17, 1959, Ser. No. 834,041

Claims priority, application Germany Sept. 13, 1958

15 Claims. (Cl. 123—41.65)

The present invention relates to a forced-air-cooled internal combustion engine provided with a quieting space or noise-reducing chamber for the combustion air.

In order to effectively damp the suction noises it is necessary, among others, to provide an arrangement of a quieting or noise-reducing chamber for the combustion air. In the prior art, the arrangement thereof was taken into consideration in a plurality of proposals which are concerned with the position as well as with the construction of a quieting or noise-reducing chamber.

For example, in one embodiment of the prior art, the chamber forming the quieting or noise-reducing space for the combustion air was operatively connected directly ahead of the carburetor and was formed as a structural unit therewith.

It is also known in the prior art to surround the carburetor with a chamber for the stabilization of the air flow.

However, all of these prior art constructions require a correspondingly relatively large space so that the accommodation thereof within the engine compartment can be realized only with difficulties.

According to the present invention, the chamber forming the quieting or noise-reducing space for the combustion air which is disposed between the intake or suction air-filter and a carburetor is actually arranged in the plane of the cooling blower supplying the cooling air for the internal combustion engine. By the use of such an arrangement, it is possible to achieve that no bulky housing is present in the engine space properly speaking whereby the individual structural parts of the internal combustion engine are readily accessible. Furthermore, the carburetor in an arrangement according to the present invention is not tied to one particular location at which a quieting chamber possibly structurally combined therewith, as known in the prior art, could have been accommodated. Consequently, the lines or ducts leading from the carburetor to the internal combustion engine may be disposed in a favorable manner. The quieting chamber in accordance with the present invention, which may be constructed thereby of considerably larger size, is formed by the air-duct housing of the cooling blower in combination with additional pressed or stamped sheet metal parts whereby the cost and expenditures are considerably reduced. It is thereby advantageous if the chamber according to the present invention is formed in one piece with the blower housing whereby a sheet-metal guide element forming the spiral or scroll for the cooling air is accommodated within the common housing. The air filter is operatively connected directly with the quieting chamber which, in turn, is operatively connected with the carburetor of the internal combustion engine over a flexible, preferably elastic, line.

The present invention additionally entails the advantage, especially with internal combustion engines accommodated below the floor plate or floor sheet-metal structure of a motor vehicle, that by reason of the possibility of an arrangement of a large-volume quieting chamber, the noises may be considerably reduced without special expenditures whereby sound-adsorbing material may also be saved or economized in the remainder of the vehicle. By reason of the particular location, in accordance with the present invention, of the air filter in direct proximity of the inlet or suction aperture of the cooling blower, separate air lines therefor are not required and, therefore, may be dispensed with herein. Furthermore, the accessibility of the air filter is thereby also improved.

Accordingly, it is an object of the present invention to provide a quieting chamber construction for air-cooled internal combustion engines which obviates the disadvantages of the prior art constructions, especially insofar as the relatively large spatial requirements thereof are concerned.

Another object of the present invention is the provision of a quieting or noise-reducing chamber construction for the combustion air which may be readily accommodated within the engine compartment or engine space without impairing accessibility to the internal combustion engine.

Still another object of the present invention is the provision of an air-noise-reducing chamber for the combustion air of a forced-air-cooled internal combustion engine provided with a cooling blower in which the noise-reducing chamber is structurally combined with the cooling blower housing to thereby reduce the number of parts required and minimize the costs connected therewith.

Another object of the present invention is the provision and arrangement of a quieting chamber for the combustion air of an air-cooled internal combustion engine which eliminates the necessity of locating the air filter and/or carburetor of the engine within a particular area of the space assigned to the engine unit.

Figure 2:
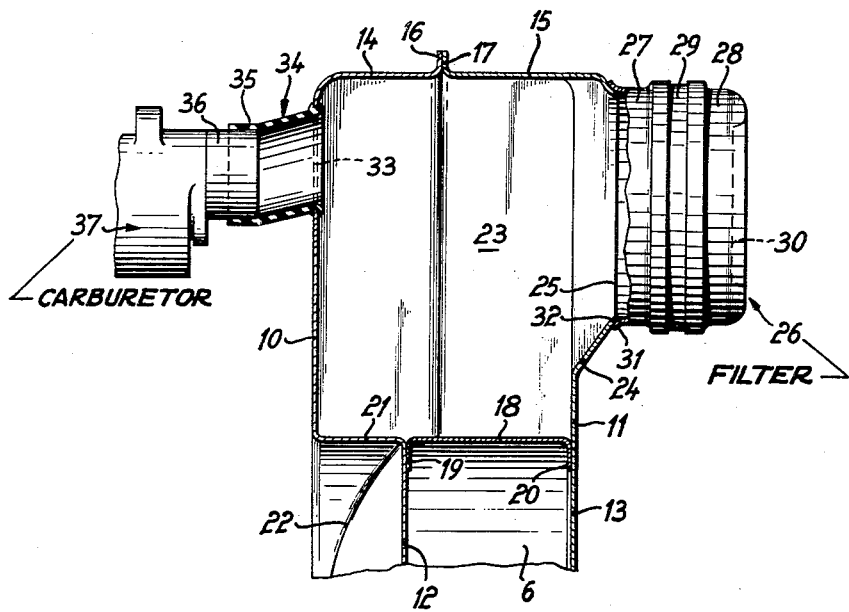

These and other objects, features and advantages of the present invention will become more obvious from the following description, when taken in connection with the accompanying drawing which shows, for purposes of illustration only, one embodiment in accordance with the present invention, and wherein Figure 1 is an elevational end view of an air-cooled internal combustion engine in accordance with the present invention and provided with oppositely disposed cylinders as well as with a cooling air blower arranged coaxially with respect to the crankshaft of the internal combustion engine, and Figure 2 is a view partially in section, on an enlarged scale, taken substantially along line II—II of Figure 1.

Referring now to the drawing, wherein like reference numerals are used throughout the two views thereof to designate corresponding parts, reference numeral 1 generally designates the internal combustion engine which serves for purposes of driving a motor vehicle and which is arranged below the sheet-metal floor member 2. The internal combustion engine 1 is constructed as a boxer-type engine provided with oppositely disposed rows of cylinders 3 and 4. A radial blower 5 is arranged in the extension of the crankshaft (not shown) of the internal combustion engine 1. The radial blower 5 is operatively connected or in communication with the air-distributing housings 8 and 9 extending below the rows of cylinders 3 and 4 by means of spirally-shaped housings or scrolls 6 and 7. The general layout of the internal combustion engine and cooling air blower system may thereby be of any conventional construction, for example, of the type more fully disclosed in my co-pending application Serial No. 810,638, filed May 4, 1959, entitled "Air-Cooled Multi-Cylinder Internal Combustion Engine," and filed in the name of Egon Forstner and myself as co-inventors, this co-pending application being assigned to the assignee of the present application. Moreover, the arrangement of the engine and of the air-cooling system may also be such as to include the details of construction of my co-pending application Serial No. 825,704, filed July 8, 1959, and entitled "Air-Cooled Internal Combustion Engine."

The spirally-shaped duct or scroll 6 is formed essentially by two pressed sheet-metal parts 10 and 11 (Figure 2) extending essentially parallel to each other which pass over into the boundary walls 12 and 13 of the spirally-shaped duct 6. The outer rim portions of the sheet-metal parts 10 and 11 are provided with angularly bent portions 14 and 15 directed against each other; the angularly bent portions are provided with end flanges 16 and 17 for purposes of their mutual connection which may be realized in any suitable manner, for example, by means of spot welding.

The space enclosed by the stamped sheet-metal parts 10 and 11 is subdivided by a baffle plate or partition wall 18 inserted therein which itself forms the radial boundary for the spirally-shaped cooling-air duct 6. The baffle plate 18 is also constructed as pressed sheet-metal part and is provided with downwardly extending rim portions 19 and 20 bent approximately at 90° with respect to baffle plate 18 for purposes of fastening the same with the pressed or stamped sheet-metal parts 10 and 11.

The stamped sheet metal parts 10 and 11 are arranged at a distance from each other which corresponds to the largest width of the spiral 6 within the region of the transition thereof into the air-distributing housing 9. Outside this region, the pressed sheet-metal part 10 is provided with an off-set portion or pressed-in recess 21 directed toward the pressed sheet-metal part 11 which off-set portion 21 has a depth increasing from the air-distributing housing 9 in the direction toward the air-cooling blower 6. The extent of the pressed-in off-set portion 21 is indicated in Figure 2 by line 22.

The chamber 23 defined by the baffle plate 18, the pressed sheet-metal parts 10 and 11 and the angularly bent portions 14 and 15 thereof serves as quieting or noise-reduction chamber for the combustion air. For that purpose, the pressed sheet-metal part 11 is provided within the region of the chamber 23 with a funnel-shaped, pressed-out portion 24 which in turn is provided with an aperture 25. An air filter generally designated by reference numeral 26 is enclosed or inserted into the aperture 25. The air filter 26 consists of two pressed or samped-out parts 27 and 28 arranged at a distance from each other, between which a filter insert 29 of any known construction is inserted. The outer pressed sheet-metal part 28 is provided with an aperture 30 for the free admission of the combustion air into the filter 26. The pressed-out sheet-metal part 27 is provided with a flange portion 31 which is welded to the correspondingly formed rim portions 32 of the aperture 25 of the pressed-out portion 24 of the stamped sheet-metal part 11.

The stamped sheet-metal part 10 is also provided with an aperture 33 for the discharge of the combustion air from the chamber 23. An elastic line or hose generally designated by reference numeral 34 and preferably made of rubber or of technically equivalent material, on the one hand, is operatively connected with the aperture 33 while, on the other, the free end 35 of the connecting member 36 of a carburetor 37 is inserted into the free end of the line 34.

The air flowing into the filter 26 through the aperture 30 is purified by the filter insert 29 and thereupon reaches the space 23. The chamber 23 is of relatively large volumetric dimensions so that the air flowing into the same is quieted. The stabilized air then flows from the chamber 23 through the aperture 33 and through the line 34 to the carburetor 37 from which it is thereupon conducted through intake lines of known constructions to the individual cylinders of the rows of cylinders 3, 4.

While I have shown one embodiment in accordance with the present invention, it is understood that the same is not limited thereto but is susceptible of many changes and modifications within the spirit and scope of the present invention. For example, the construction of the pressed or stamped sheet-metal parts which form the cooling-air spiral-shaped ducts and quieting space, under certain circumstances, may be different from the details of construction thereof shown herein. For example, it is also within the purview of the present invention to construct the chamber 23 as a separate structural part which is thereupon attached or installed at the blower. Furthermore, one chamber 23 each may be installed or combined with each of the two cooling-air spiral-shaped ducts, one of each such ducts being provided for each row of cylinders as more fully disclosed in the aforementioned co-pending application Serial No. 810,638. Each such quieting or noise-reducing chamber may thereby be connected with one or several carburetors, either individually or by means of common lines.

Thus, it is obvious that the present invention is not limited to the details described and shown herein but is susceptible of many changes and modifications within the spirit and scope of the present invention, and I, therefore do not wish to be limited to the details described and shown herein but intend to cover all such changes and modifications thereof as are encompassed by the scope of the appended claims.

I claim:

1. In an air-cooled internal combustion engine provided with cooling blower means supplying cooling air to said internal combustion engine, with an intake air filter, and with carburetor means, comprising means forming a quieting space for combustion air operatively connected between said intake air filter and said carburetor means, said cooling blower means including air-guide housing means, said quieting space being separate and distinct from said cooling blower means and out of communication therewith, and said first-mentioned means forming said quieting space being disposed essentially within the plane of said cooling air blower means for said combustion engine and being constituted by said air-guide housing means and by adidtional stamped sheet metal parts.

2. In an air-cooled internal combustion engine, the combination according to claim 1, wherein said means forming said quieting space is formed integrally with said blower housing means, and further comprising a guide sheet metal member within said common housing means forming the spiral for the cooling air.

3. In an air-cooled internal combustion engine, the combination according to claim 2, wherein said intake-air filter is connected directly with said space.

4. In an air-cooled internal combustion engine, the combination according to claim 3, further comprising elastic connecting means elastically connecting said quieting spaced with said carburetor.

5. In an air-cooled internal combustion engine provided with cooling blower means supplying cooling air to said internal combustion engine, with a suction-air filter, and with fuel mixing means, comprising means forming a quieting space for combustion air operatively connected between said suction-air filter and said fuel mixing means, said first-mentioned means forming said quieting space being disposed essentially within the plane of said cooling air blower means for said combustion engine, said suction air filter being connected directly to said quieting space.

6. In an air-cooled internal combustion engine provided with cooling blower means supplying cooling air to said internal combustion engine, with a suction-air filter, and with fuel mixing means, comprising means forming a quieting space for combustion air operatively connected between said suction-air filter and said fuel mixing means, said first-mentioned means forming said quieting space being disposed essentially within the plane of said cooling air blower means for said combustion engine, and an elastic line operatively connecting said quieting space with said fuel mixing means.

7. An air-cooled internal combustion engine provided with cooling air blower means, comprising means forming a quieting space for combustion air, an intake-air filter, and fuel mixing means operatively connected with said internal combustion engine, said quieting space being effectively connected between said filter and said fuel mixing means, said first-mentioned means forming said quieting space being disposed essentially within the plane of said cooling air blower means for said combustion engine, and said first-mentioned means including wall means maintaining said quieting space out of communication with said cooling air blower means.

8. An air-cooled internal combustion engine provided with cooling blower means including air-guide housing means, comprising means including said air-guide housing means forming a quieting space of relatively large volume for combustion air, an air filter, and carburetor means operatively connected with said internal combustion engine, said quieting space being effectively disposed between said intake-air filter and said carburetor means, and said first-mentioned means forming said quieting space being disposed essentially within the plane of said cooling air blower means for said combustion engine and including means separating air in said quieting space from air in said blower means.

9. An air-cooled internal combustion engine according to claim 8, wherein said air-guide housing means includes pressed sheet metal parts and wherein said quieting space is formed by some of said sheet metal parts and additional sheet metal parts.

10. An air-cooled internal combustion engine comprising cooling blower means including a plurality of sheet-metal wall members forming an air guide duct for the cooling air, means including some of said wall members forming a quieting space of relatively large volume for combustion air and separating the combustion air from air in the blower means, an air filter, and a carburetor operatively connected with said internal combustion engine, said quieting space being operatively connected intermediate sad filter and said carburetor, and said first-mentioned means forming said quieting space being disposed essentially within the plane of said cooling air guide duct.

11. An air-cooled internal combustion engine according to claim 10, wherein said cooling blower means includes two essentially parallelly extending sheet metal wall members spaced along the outer part thereof at a distance corresponding to the width of said cooling blower means and along the inner part thereof at a lesser distance, said inner part forming a spirally-shaped air duct and said outer part forming said quieting space and including a baffle plate extending intermediate said two parallelly extending wall members within the region between said outer and inner part.

12. An air-cooled internal combustion engine according to claim 10, wherein said quieting space is provided with a flanged aperture in one of said wall members, and wherein said air filter is secured in said flanged aperture.

13. An air-cooled internal combustion engine according to claim 12, further comprising an elastic line connecting the opposite side of said air filter opposite from said aperture with said carburetor.

14. An air-cooled internal combustion engine according to claim 10, wherein said cooling blower means is provided with two of said air guide ducts.

15. An air-cooled internal combustion engine according to claim 14, wherein said two air guide ducts are spirally shaped.

References Cited in the file of this patent
UNITED STATES PATENTS

| | | |
|---|---|---|
| 1,922,200 | Frank | Aug. 15, 1933 |
| 2,747,558 | Kiekhaefer | May 29, 1956 |